F. AUS DER MARK.
LEVELING APPARATUS FOR HORIZONTAL COKE OVENS.
APPLICATION FILED MAY 20, 1909.
985,266. Patented Feb. 28, 1911.
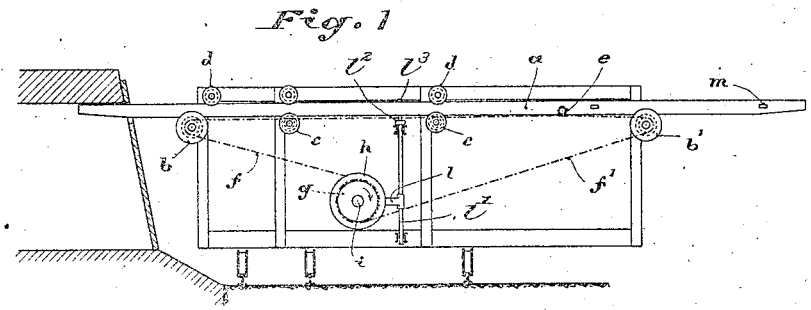
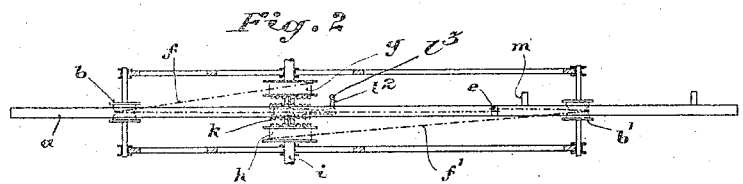
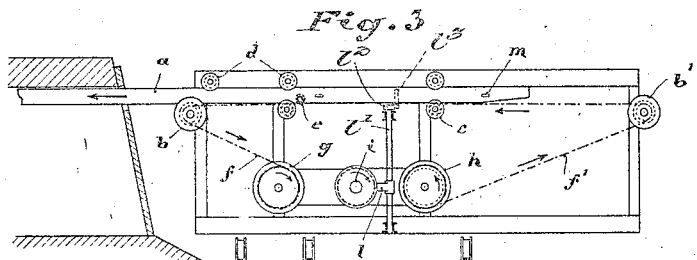
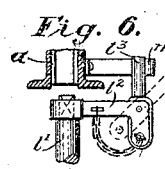
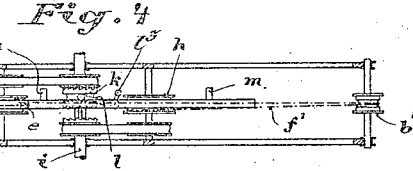

UNITED STATES PATENT OFFICE.

FRIEDRICH AUS DER MARK, OF STERKRADE, GERMANY.

LEVELING APPARATUS FOR HORIZONTAL COKE-OVENS.

985,266.   Specification of Letters Patent.   Patented Feb. 28, 1911.

Application filed May 20, 1909. Serial No. 497,236.

*To all whom it may concern:*

Be it known that I, FRIEDRICH AUS DER MARK, a subject of the German Emperor, residing at Sterkrade, Rheinland, in Germany, have invented a certain new and useful Leveling Apparatus for Horizontal Coke-Ovens, of which the following is a specification.

In the hitherto known mechanical leveling apparatus for coking ovens the leveling or trimming bars either have teeth throughout their length or only at their rear ends. This renders several machine parts necessary for actuating the bar from the driving axle. In the more modern levelers, in which the motor runs continuously in one direction, the number of intermediate parts is further increased, so that half the power required is wasted by friction, and a violent jar takes place at each reversal. The present invention obviates this difficulty by means of a simple and reliable device, which consists in using a rope attached at the middle to the bar and led to the right and left over rollers carried by the frame, and from these rollers to two drums or pulleys loosely and independently mounted on the driving axle, the rope being led to the top of one drum and the bottom of the other. By alternately clutching the two drums, by means of a clutch between them, the desired reciprocation of the bar is produced. The reversal of the clutch is either performed manually by the motor-man, or automatically by the bar, during the leveling.

Two forms of construction are shown in the accompanying drawing, in which—

Figures 1 and 2 diagrammatically represent an apparatus wherein the two pulleys or drums are both on one shaft, with the clutch between them. Figs. 3 and 4 show similar apparatus, with the difference that the pulleys are side-by-side on parallel shafts and are alternately clutched. Fig. 5 illustrates the application of the invention to an electrically actuated machine which also serves as a coke-expelling machine. Fig. 6 is a detail of part of the reversing mechanism.

The toothless bar $a$, guided by the rollers $b$, $b_1$, $c$, $d$, has the rope $f$, $f_1$, attached to it at $e$. The part $f$ of the rope, passing over the roller $b$ at the oven-side of the frame, is actuated by the drum $g$: the part $f_1$, passing over the roller $b_1$ on the off-side, is actuated by the drum $h$. The two drums $g$ and $h$ are loose on the shaft $i$, which revolves continuously in the direction indicated by the arrow. When the clutch $k$ is operated by the lever $l$ to clutch the drum $g$ the bar $a$ pulled by the rope $f$, moves into the coking chamber, the rope $f_1$ being unwound from the drum $h$. When the drum $h$ is clutched the bar moves in the opposite direction. By this means not only the insertion and withdrawal are effected, but the action of the clutch $k$ causes the bar to be moved during the trimming operation. After bar $a$, has been properly introduced into the oven, it is automatically reciprocated by the following means: Lever $l$, is secured to a vertical shaft $l'$, which carries at its top a crank $l^2$, provided at its free end with a displaceable pin $l^3$. The latter is arranged in the path of a pair of stops $m$, projecting laterally from bar $a$. When introducing the bar into the oven, pin $l^3$, is swung downward to clear stop $m$. After the bar has been so far advanced that pin $l^3$, has arrived intermediate stops $m$, said pin is returned to its original position, whereupon the device is started. Stops $m$, by engaging pin $l^3$, will tilt crank $l^2$, so as to intermittently oscillate lever $l$, and thus alternately couple drums $g$ and $h$, to shaft $i$. In this way the direction of travel of rope $f$, $f'$, is reversed when bar $a$, arrives at its terminal positions, as will be readily understood.

I claim:

A leveling apparatus for horizontal coke ovens, comprising a leveling bar, a driving shaft journaled below said bar, drums loosely mounted on said shaft, a clutch arranged between the drums, a gear rope attached to the bar and wound around the drums in opposite directions, a reversible clutch-lever, a pair of stops on the leveling bar, and a pin pivoted to the lever and being adapted to be swung into or out of the paths of said stops.

Signed by me at Barmen, Germany, this 7th day of May 1909.

FRIEDRICH AUS DER MARK. [L. S.]

Witnesses:
 OTTO KÖNIG,
 C. J. WRIGHT.